United States Patent
Kuribayashi et al.

(10) Patent No.: US 6,496,462 B2
(45) Date of Patent: Dec. 17, 2002

(54) OPTICAL RECORDING METHOD, OPTICAL RECORDING APPARATUS, AND OPTICAL RECORDING MEDIUM

(75) Inventors: Isamu Kuribayashi, Tokyo (JP); Hajime Utsunomiya, Tokyo (JP); Masanori Shibahara, Tokyo (JP); Toshiki Aoi, Tokyo (JP)

(73) Assignee: TDK Corporation, Tokyo (JP)

( * ) Notice: Subject to any disclaimer, the term of this patent is extended or adjusted under 35 U.S.C. 154(b) by 97 days.

(21) Appl. No.: 09/820,366

(22) Filed: Mar. 29, 2001

(65) Prior Publication Data

US 2001/0043539 A1 Nov. 22, 2001

(30) Foreign Application Priority Data

Mar. 30, 2000 (JP) .......................... 2000-095795
Jan. 31, 2001 (JP) .......................... 2001-024896

(51) Int. Cl.[7] .................................. G11B 5/76
(52) U.S. Cl. .................... 369/59.11; 369/275.2
(58) Field of Search ............... 369/59.11, 272, 369/275.2, 283, 288, 47.38, 47.39, 47.5, 47.51, 47.52, 47.55, 116

(56) References Cited

U.S. PATENT DOCUMENTS 6,153,355 A  * 11/2000 Takahashi et al. ....... 369/275.2
6,187,406 B1 *  2/2001 Ichihara et al. ............ 369/283
6,294,310 B1 *  9/2001 Ohno et al. ............... 369/275.2

FOREIGN PATENT DOCUMENTS

JP         2000-11380        1/2000

* cited by examiner

Primary Examiner—Paul W. Huber
(74) Attorney, Agent, or Firm—Oblon, Spivak, McClelland, Maier & Neustadt, P.C.

(57) ABSTRACT

In a phase change optical recording medium, time required for recording the unrecorded area as well as jitter produced are reduced. Provided is an optical recording method for recording an optical recording medium having a phase change recording layer, wherein the recording is conducted such that: $V_W/V_o>1$, and $0.3<P_{ew}/P_{eo}<1$ when unrecorded area of the recording layer is recorded by using a linear velocity of $V_W$ and an erasing power of $P_{ew}$ and overwritten by using a linear velocity of $V_o$ and an erasing power of $P_{eo}$,

11 Claims, 2 Drawing Sheets

RECORDING/READING BEAM

RECORDING/READING BEAM

OPTICAL RECORDING METHOD, OPTICAL RECORDING APPARATUS, AND OPTICAL RECORDING MEDIUM

BACKGROUND OF THE INVENTION

1. Field of the Invention

This invention relates to a phase change optical recording medium, a method for recording such medium, and a apparatus for recording such medium.

2. Prior Art

Highlight is recently focused on optical recording media capable of recording information at a high density and erasing the recorded information for overwriting. One typical overwritable optical recording medium is phase change optical recording medium which is used by irradiating the recording layer with a laser beam to change its crystalline state whereupon a change in reflectivity caused by the change of the crystalline state is detected for reading of the information. The phase change optical recording media are of great interest since the optical system of the drive unit is simple as compared to magnetooptical recording media.

The recording layer of phase change type is most often constituted from a material of chalcogenide system such as Ge—Sb—Te system which provides a substantial difference in reflectivity between the crystalline and the amorphous states as well as a relatively stable amorphous state.

When information is recorded on the optical recording medium of phase change type, a laser beam of high power (recording power) is applied so that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallization temperature and lower than the melting temperature. The record mark to which the laser beam of erasing power is applied is heated to a temperature higher than the crystallization temperature and then allowed to slowly cool to recover the crystalline state. Accordingly, in the optical recording media of phase change type, the medium can be overwritten by modulating the intensity of a single light beam. However, when a medium wherein the medium structure and the composition of the recording layer are optimized for use at a particular linear velocity is overwritten at a linear velocity higher than the designed linear velocity, the record marks formed can be no longer crystallized by the same erasing power, and in other words, the record marks become unerasable.

The object in the invention described in JP-A 11380/2000 is speeding up of the recording, and in particular, speeding up of the formatting of a phase change optical recording medium. In the recording of the data in an overwritable phase change optical recording medium in the invention described in JP-A 11380/2000, a higher linear velocity is used for the initial recording operation wherein the data are recorded in the unrecorded area for the first time compared to the overwriting operation wherein the data are overwritten. JP-A 11380/2000 states that the entire surface of the phase change optical recording medium is initialized (crystallized) after its production no erasure is required in the formatting, and as a consequence, no problem is associated with the recording at a linear velocity higher than the one used in the overwriting operation. JP-A 11380/2000 also states that the formatting can be accomplished by the recording at binary values, namely, at the recording power and the reading power since the formatting does not require the erasure.

SUMMARY OF THE INVENTION

The inventors of the present invention have conducted an experiment wherein the initial recording to the unrecorded area is conducted at a linear velocity higher than the optimal linear velocity employed in the overwriting operation as in the case of the invention described in the JP-A 11380/2000. It was then found that increase in the jitter is induced in both cases wherein no erasing power is applied and wherein normal erasing power (the erasing power used in the overwriting operation) is applied in the initial recording to the unrecorded area.

An object of the present invention is to reduce the time required for the recording of the unrecorded area in the recording of the recording layer of the phase change optical recording medium. Another object of the invention is to reduce the jitter produced in such recording.

Such objects are attained by the present invention of the constitution as described in any of the (1) to (11), below.

(1) An optical recording method for recording an optical recording medium having a phase change recording layer wherein the recording is conducted such that:

$$V_w/V_o > 1,$$

and $$0.3 < P_{ew}/P_{eo} < 1$$

when the unrecorded area of the recording layer is recorded by using a linear velocity of $V_w$ and an erasing power of $P_{ew}$ and overwritten by using a linear velocity of $V_o$ and an erasing power of $P_{eo}$.

(2) An optical recording method according to the above (1) wherein the recording is conducted such that:

$$2 \leq V_w/V_o \leq 20.$$

(3) An optical recording method according to the above (1) or (2) wherein the recording is conducted such that:

$$0.5 \leq P_{ew}/P_{eo} \leq 0.9.$$

(4) An optical recording method according to any one of the above (1) to (3) wherein the recording is conducted such that:

$$P_{ww}/P_{wo} > 1$$

when the unrecorded area of the recording layer is recorded by using a recording power of $P_{ww}$ and overwritten by using a recording power of $P_{wo}$.

(5) An optical recording method according to the above (4) wherein the recording is conducted such that:

$$1.1 \leq P_{ww}/P_{wo} \leq 2.$$

(6) An optical recording method according to any one of the above (1) to (5) wherein said method is conducted by using an optical recording medium having recording conditions used in the overwriting operation and recording conditions used in the recording of the unrecorded area.

(7) An optical recording method according to any one of the above (1) to (6) wherein said unrecorded area is either an area which has never been recorded after the initialization or an area which has been erased after recording.

(8) An optical recording method according to any one of the above (1) to (7) wherein said linear velocity $V_o$ is the optimal linear velocity in the overwriting operation and said $P_{eo}$ is the optimal erasing power in the overwriting operation.

(9) An optical recording method according to any one of the above (1) to (8) wherein said medium is not overwritable at said linear velocity $V_w$.

(10) An optical recording apparatus for conducting the optical recording method according to any one of the above (1) to (9).

(11) An optical recording medium to which the optical recording method according to any one of the above (1) to (9) is applied, wherein said medium has recording conditions used in the overwriting operation and recording conditions used in the recording of the unrecorded area.

DETAILED DESCRIPTION OF THE INVENTION

Recording Method

Figure 1:
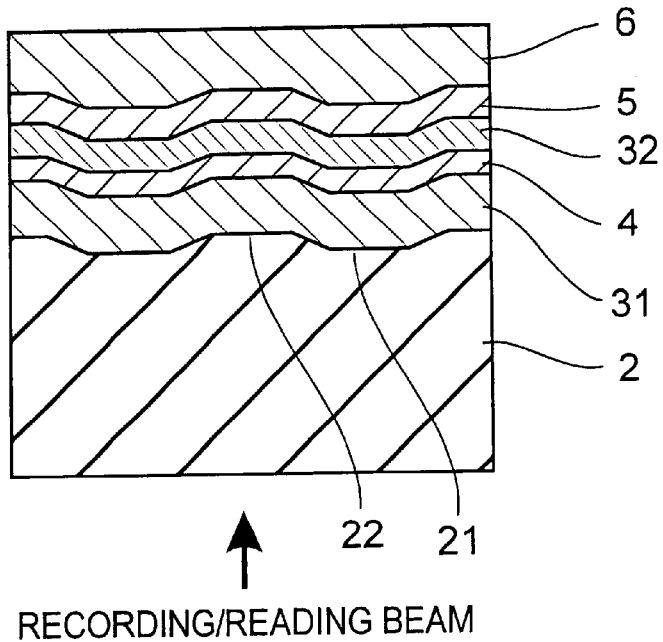
FIG. 1 is a partial cross sectional view of the optical recording medium according to an embodiment of the present invention.

In the present invention, a higher linear velocity is used for the linear velocity $V_w$ in the recording of the unrecorded area of the recording layer, namely, for the linear velocity $V_w$ of the initial recording operation compared to the linear velocity used in the overwriting operation. Namely, $V_w$ and $V_o$ are such that:

$$V_w/V_o > 1,$$

and more preferably, $$V_w/V_o \geq 2.$$

This enables the initial recording operation to be carried out at a high speed. However, when $V_w/V_o$ is too large, control of the erasing power for suppression of the jitter as described below will not effectively function, and in addition, the recording machine may not be able to support such linear velocity. In view of such situation, the $V_w/V_o$ is preferably such that:

$$V_w/V_o \leq 20,$$

and more preferably, $$V_w/V_o \leq 10.$$

In the present invention, the linear velocity of the initial recording operation and the linear velocity of the overwriting operation are not limited to specific values. However, the linear velocity of the overwriting operation is typically in the range of 0.8 to 20 m/s, and preferably, 1.2 to 16 m/s.

The present invention shares the feature that $V_w/V_o$ is greater than 1 with the invention described in the JP-A 11380/2000. However, in contrast to the description of the JP-A 11380/2000, the erasing power $P_{ew}$ of the initial recording operation is limited in the present invention in relation to the erasing power $P_{eo}$ of the overwriting operation such that:

$$0.3 < P_{ew}/P_{eo} < 1,$$

and more preferably, $$0.5 \leq P_{ew}/P_{eo} \leq 0.9.$$

This enables decrease of jitter in the initial recording operation. The jitter critically increases when the $P_{ew}/P_{eo}$ is too large or too small. The reason why such decrease of litter is enabled by the control of the erasing power is not clear while it is estimated that the value of the erasing power affects the shape of the amorphous record mark formed. It should be noted that the $P_{ew}/P_{eo}$ is preferably controlled within the above described range corresponding to the $V_w/V_o$ the above described range, and that the $P_{ew}/P_{eo}$ is preferably reduced in relation to the increase of the $V_w/V_o$.

In the present invention, the recording power $P_{ww}$ used in the recording of the unrecorded area of the recording layer and the recording power $P_{wo}$ used in the overwriting operation are preferably such that:

$$P_{ww}/P_{wo} > 1.$$

Use of the $P_{ww}$ greater than the $P_{wo}$ enables decrease of the jitter in the initial recording operation. $P_{ww}/P_{wo}$ is preferably adjusted corresponding to the increase or decrease of the $V_w/V_o$, and for example, $P_{ww}/P_{wo}$ is preferably within the range of:

$$1.01 \leq P_{ww}/P_{wo} \leq 2$$

when the $V_w/V_o$ is within the preferable range as described above.

As described above, the $V_o$ used in the determination of the linear velocity $V_w$ of the initial recording operation in the present invention is the linear velocity used in the overwriting operation. However, there are some cases wherein the linear velocity used in the overwriting operation is not automatically determined to one value as in the case of 4x-10xCD-RW. In such a case, the highest of the applicable linear velocities is selected for the linear velocity $V_o$. The $P_{eo}$ and the $P_{wo}$ respectively used in determining the erasing power $P_{ew}$ and the recording power $P_{ww}$ are typically the optimal values in the overwriting operation. In the present invention, the optimal values are any of the values at which the jitter is minimized, the values recommended by the producer of the medium, and the optimal values defined in the specification to which the medium belongs. In the present invention, however, employment of the optimal values for the $P_{eo}$ and the $P_{wo}$ is not critical, and at least one of the optimal values may be a value which is not optimal as long as the jitter is below the acceptable level. The optimal values for the $P_{eo}$ and the $P_{wo}$ may be measured by recording the unrecorded area once, and recording the same area for the second time. However, when the medium fails to exhibit stable characteristics as in the case of the recording immediately after the initialization, the optimal values are preferably determined after repeating the overwriting operations until the medium exhibits stable characteristics.

Figure 3:
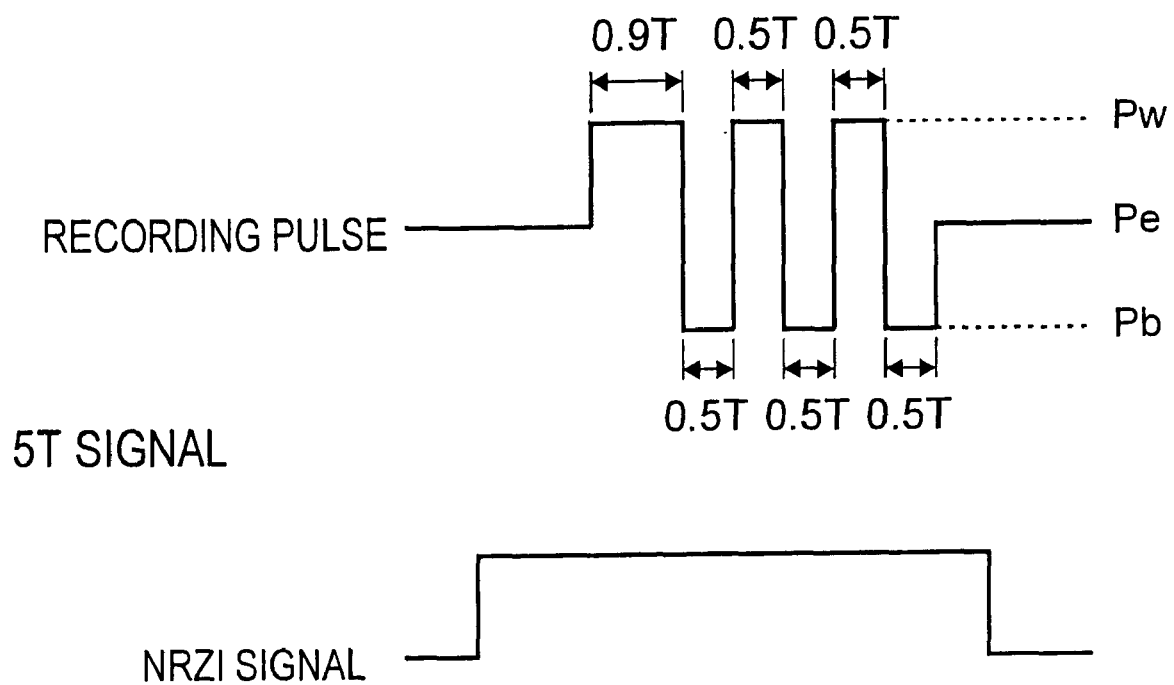
FIG. 3 is a graph showing an embodiment of the recording pulse strategy.

In the present invention, modulation pattern of the laser beam used in the initial recording operation and in the overwriting operation is not particularly limited as long as the modulation pattern has the level of the recording power and the level of the erasing power. In the case of the overwriting, a suitable recording pulse strategy is generally determined by the procedure as described below. In the following, recording pulse strategy is explained. A phase change optical recording medium is generally recorded, not by continuously irradiating the medium with a laser beam of the recording power for the duration corresponding to the length of the record mark, but by irradiating the medium with a laser beam divided in a pulse train comprising a plurality of pulses for the control of the record mark shape as described in JP-A 7176/1997. Constitution of the pulse division is generally referred to as the recording pulse strategy. An exemplary recording waveform is shown in FIG. 3 for the purpose of explaining the recording pulse strategy. It should be noted that the term "recording waveform" used herein designates the driving signal pattern used for modulation of the intensity of the recording beam. The recording waveform shown in FIG. 3 has a recording pulse train corresponding to 5T signal of NRZI signal. In FIG. 3, lateral direction corresponds to the time, and vertical direction corresponds to the power level of the laser beam. Each pulse width is generally indicated by the value normalized with standard clock width (1T). In the recording pulse strategy shown in FIG. 3, the power levels used are three levels, namely, $P_w$ (recording power), $P_e$ (erasing power) lower than the $P_w$, and $P_b$ (bias power) lower than the $P_e$. In the waveform shown in FIG. 3, intensity of the upward pulses in the recording pulse train is $P_w$, and the intensity of the downward pulses is $P_b$, and the intensity of the DC part connecting adjacent recording pulse trains is $P_e$.

The recording pulse strategy used in the initial recording operation does not necessarily be the same as the one used in the overwriting operation. In addition, pulse division is not necessary in the case of the recording pulse strategy used in the initial recording operation.

In the initial recording operation, no record marks are present in the recording layer, and erasure of the record marks is not required. Therefore, the medium is not required in the present invention to be rewritable at the linear velocity $V_w$, and in other words, the medium used in the present invention may be the one which does not function as a rewritable medium but which functions as a write once medium at the linear velocity $V_w$. However, sufficient decrease of the jitter is not realized even if the medium is unrewritable in the initial recording operation at the linear velocity $V_w$ unless the erasing power $P_{ew}$ in the initial recording operation is controlled according to the present invention. To be more specific, if no erasing power is applied in the initial recording of the unrecorded area in view of the unnecessity of the erasure, jitter will be unduly increased. It should be noted that no such concept as "erasing power" is generally used for the recording of write once type. In the present invention, however, the power $P_e$ of the DC part in the recording waveform as shown in FIG. 3 is referred to as the "erasing power" even when the recording conducted is of write once nature.

By the way, the overwriting operation is not critical in the present invention. In other words, the recording method of the present invention is also applicable to a write once medium wherein only the initial recording operation is conducted.

A phase change medium which functions as a write once medium should satisfy the first to the fourth conditions as described below. When a phase change medium is to be used as a write once medium, at least one of the following four conditions should be satisfied.

The first condition is, when an optical recording medium having a phase change recording layer is recorded such that CNR (carrier to noise ratio) of the minimum signal is at least 45 dB and preferably at least 48 dB, and erased such that a laser beam at the power level that does not melt the recording layer is irradiated at the linear velocity the same as the one used in the recording, decrease of the carrier of the minimum signal is 20 dB or less and more preferably 18 dB or less. When the decrease of the carrier is within such range, reading of the signal recorded again after the erasing operation will be impossible. Although it has been known that the phase change medium can be used as a write once medium, the condition required for such use as a write once medium has not been clear. With regard to the rewritable phase change medium, it has been known that the medium can be recorded again after the erasing operation, namely, that the medium is rewritable when the erasability is at least 25 dB. Accordingly, it is estimated that the medium is unrewritable, namely, the recorded data is not altering when the erasability is less than 25 dB. However, in the investigation of the inventors of the present invention, it has been found out that, the signal recorded again after the erasing operation is readable even when the erasability is less than 25 dB if decrease of the carrier of the minimum signal is not 20 dB or less.

In the present invention, amorphous record marks should be formed in the crystalline recording layer while the layer is formed as an amorphous layer in the case of the phase change recording layer formed by vapor deposition such as sputtering. Therefore, at least the recording area (the area which it to be used for the recording) of the recording layer should be crystallized before the recording. This step of crystallization is generally referred to as the "initialization". The crystallization of the as deposited recording layer, however, is quite difficult, and when a design wherein decrease of the carrier of the minimum signal is markedly reduced, namely, a design wherein the recrystallization of the recording layer is extremely difficult is employed in the present invention, the initialization will be required to be conducted at an extremely low linear velocity and the productivity will be markedly reduced. In consideration of this, the decrease of the carrier of the minimum signal in the erasing operation in the first condition is preferably at least 5 dB, and when the linear velocity used in the recording is relatively low, the decrease of the carrier is preferably at least 10 dB.

The second condition is, when an optical recording medium having a phase change recording layer is recorded with a random signal and the area recorded with the random signal is read, and the maximum reflection level in the reading operation is designated the maximum reflection level $R_{ini}$; and when the area recorded with the random signal is erased by irradiating the area with the DC laser beam at the linear velocity the same as the one used in the random signal recording, and the area irradiated with the DC laser beam is read, and the maximum reflection level and the minimum reflection level in the reading are designated the maximum reflection level $R_{top}$ and the minimum reflection level $R_{bottom}$, the relation:

$$(R_{top}+R_{bottom})/2R_{ini}<1$$

is satisfied, and preferably, the relation:

$$(R_{top}+R_{bottom})/2R_{ini}\leq 0.95$$

is satisfied. It should be noted that the reflection level is the amount of the light reflected back to the optical head, and the $R_{ini}$ corresponds to the reflection level of the crystalline area between the record marks.

The second condition should be satisfied irrespective of the power level of the DC laser beam. To be more specific, $(R_{top}+R_{bottom})/2R_{ini}$ should be within the range as described above irrespective of whether the DC laser beam is the one which melts the recording layer or the one which does not melt the recording layer. When the second condition is satisfied in the case wherein the DC laser beam does not melt the recording layer, it means that crystallization of the recording layer in the solid phase by the irradiation of the DC laser beam is impossible. On the other hand, when the second condition is satisfied in the case wherein the DC laser beam melts the recording layer, it means that the recording layer becomes amorphous when cooled from the molten state. In contrast, when a DC laser beam is irradiated to a rewritable phase change medium with the power level gradually increased, the recording layer will either crystallize in solid phase or crystallize from the liquid phase, and there exists a power level at which $(R_{top}+R_{bottom})/2R_{ini}$ becomes $(R_{top}+R_{bottom})/2R_{ini} \geq 1$.

The third condition is, when an optical recording medium having a phase change recording layer is recorded with a random signal, and thus recorded random signal is overwritten with a random signal at the same linear velocity, and the signal is read, reading of the signal is impossible. It should be noted that the random signal is preferably recorded under the optimal recording condition, which is the recording condition wherein the jitter is minimized when the recording is conducted to a recording layer immediately after its initialization, the optimal recording condition recommended by the producer of the medium, or the optimal recording condition defined in the specification to which the medium belongs.

The fourth condition is, when an optical recording medium having a phase change recording layer is recorded with a random signal, the area recorded with the random signal is erased by irradiating a DC laser beam at the linear velocity the same as the one used in the random signal recording, the irradiated area is overwritten with a random signal, and the area is read, reading of the signal is impossible. It should be noted that the random signal is preferably recorded under the optimal recording condition as described above.

The fourth condition should be satisfied irrespective of the power level of the DC laser beam. To be more specific, the random signal recorded after the irradiation of the DC laser beam should be unreadable irrespective of whether the DC laser beam is the one which melts the recording layer or the one which does not melt the recording layer. When the fourth condition is satisfied in the case wherein the DC laser beam does not melt the recording layer, it means that crystallization of the recording layer in the solid phase by the irradiation of the DC laser beam is impossible. On the other hand, when the fourth condition is satisfied in the case wherein the DC laser beam melts the recording layer, it means that the recording layer becomes amorphous when cooled from the molten state. In contrast, in the case of a rewritable phase change medium, the recording layer will either crystallize in solid phase or crystallize from the liquid phase by the irradiation of the DC laser beam, and the area irradiated with the DC laser beam is rewritable in either case.

It should be noted that, in the present invention, reading of the signal is deemed impossible preferably when the clock jitter is in excess of 13%, and more preferably when the clock jitter is in excess of 15%.

In the present invention, the "initial recording operation" means the recording of the recording layer in the unrecorded area, namely, in the crystalline area where no amorphous record marks are present, and the "unrecorded area" means the area where no recording has been conducted after the initialization (crystallization), or the area which has been erased (crystallized) after the recording.

Constitution of the Medium

An embodiment of the optical recording medium to which the present invention is applicable is shown in FIG. 1. This optical recording medium is a single side-recording (single plate) medium comprising a light-transmitting substrate 2, and a first dielectric layer 31, a recording layer 4 of phase change type, a second dielectric layer 32, a reflective layer 5, and a protective layer 6 disposed on the light-transmitting substrate 2 in this order. It should be noted that the present invention is also applicable to a double side-recording medium wherein two such single side-recording mediums have been adhered with each other with the protective layer 6 in the inside by an intervening adhesive layer. The present invention is also applicable to a medium wherein such single side-recording medium has been adhered to a protective substrate with an intervening adhesive layer.

Light-transmitting Substrate 2

In the use of this optical recording medium, the recording layer 4 is irradiated by the recording/reading beam which has passed through the light-transmitting substrate 2. Therefore, the light-transmitting substrate 2 preferably comprises a material substantially transparent to the recording/reading beam such as a resin or a glass. Exemplary resins which may be employed include acrylic resins, polycarbonate resins, epoxy resins, and polyolefins.

The light-transmitting substrate 2 is formed with the grooves 21 and the lands 22 between the adjacent grooves 21. When seen from the side of the light beam incidence (from the side of the light-transmitting substrate 2), the surface of the groove 21 is relatively nearer to the side of the light beam incidence compared to the surface of the land 22. Either one or both of the land 22 and the groove 21 may be used as the recording track. The width of the groove and the land may be either the same or different.

The light-transmitting substrate 2 may preferably have a thickness of up to 2 mm, and more preferably, a thickness in the range of 0.2 to 1.5 mm. An excessively thick light-transmitting substrate 2 results in reduced tilt margin while an excessively thin light-transmitting substrate 2 results in higher susceptibility to deformation, and hence, in an increased error. Although the light-transmitting substrate is not limited for its shape, the light-transmitting substrate is typically formed in the shape of a disk having a diameter of about 50 to 360 mm.

It should be noted that, in the embodiment shown in FIG. 1, the light-transmitting substrate 2 comprises a resin plate or a glass plate having a thickness sufficient for retaining its shape with no support by other members. The present invention, however, is also applicable to an optical recording medium comprising a light-transmitting substrate with reduced thickness for the purpose of increasing the recording density. An embodiment of such thin light-transmitting substrate is shown in FIG. 2.

Figure 2:
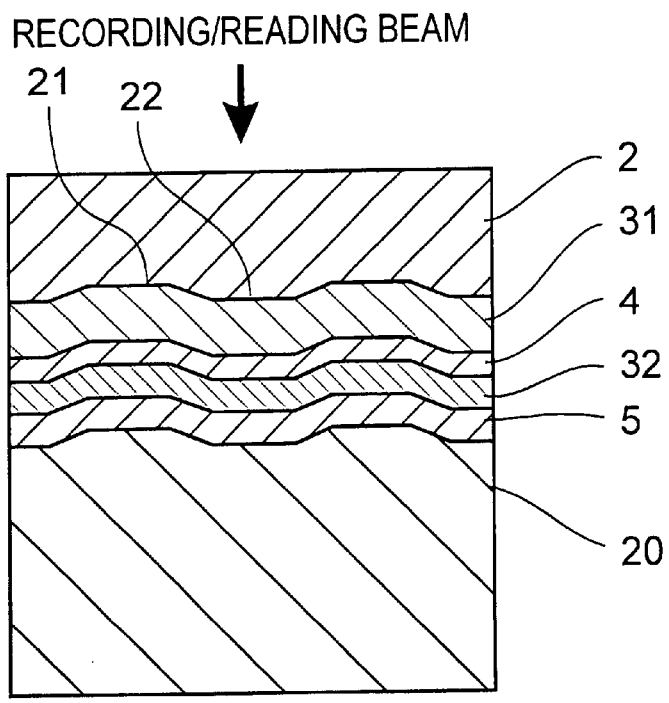
FIG. 2 is a partial cross sectional view of the optical recording medium according to another embodiment of the present invention.

The optical recording medium shown in FIG. 2 is a medium of single side-recording type comprising a supporting substrate 20, and a reflective layer 5, a second dielectric layer 32, a recording layer 4, a first dielectric layer 31, and a light-transmitting substrate 2 formed on the supporting substrate 20 in this order. The supporting substrate 20 of FIG. 2 comprises a resin plate or a glass plate having a thickness sufficient for retaining its shape with no support by other members as in the case of the light-transmitting substrate 2 of FIG. 1. The order how the layers are disposed on the supporting substrate 20 from the reflective layer 5 to the first dielectric layer 31 is the same as the embodiment shown in FIG. 1 when seen from the side of the recording/reading beam incidence (from the side of the light-transmitting substrate 2).

The light-transmitting substrate 2 of FIG. 2 has a light transmittance sufficient for transmitting the recording/reading beam. For example, the light-transmitting substrate 2 may comprise a resin plate or a glass plate having a thickness substantially equivalent to that of the supporting substrate 20.

However, when a recording/reading optical system having a high NA (numerical aperture) is used for the purpose of achieving a high recording density, use of a thinner light-transmitting substrate 2 is preferable as in the case of the light-transmitting layer described, for example, in JP-A 7658/1999 as described above. In such a case, the thickness of the light-transmitting substrate 2 is preferably selected from the range of 30 to 300 μm. When the light-transmitting substrate 2 is too thin, unduly serious optical effects may be brought by the dust attached to the surface of the light-transmitting substrate 2. On the other hand, when the light-transmitting substrate 2 is too thick, recording at a higher recording density by the use of a higher NA will be difficult.

The thin light-transmitting substrate 2 may be provided, for example, by adhering a light-transmitting sheet comprising a light-transmitting resin on the first dielectric layer 31 by means of an adhesive, or by directly forming the light-transmitting resin layer on the first dielectric layer 31 by coating.

As in the case of FIG. 1, in the light-transmitting substrate 2 shown in FIG. 2, the surface of the groove 21 is also relatively nearer to the side of the recording/reading beam incidence compared to the surface of the land 22 when seen from the side of the light beam incidence. The land 22 and the groove 21 of the light-transmitting substrate 2 may be formed by providing a negative recess-and-projection pattern on the supporting substrate 20 and disposing the dielectric layers, the recording layer and other layers as well as the light-transmitting substrate 2 such that the recess-and-projection pattern is transferred to the light-transmitting substrate 2.

First Dielectric Layer 31 and second Dielectric Layer 32

These dielectric layers prevent oxidation and degradation of the recording layer 4, and also, protect the supporting substrate 20 and the light-transmitting substrate 2 from the heat transmitted from the recording layer 4 during the recording by blocking the heat or by dissipating such heat in lateral direction of the layer. Provision of the dielectric layers also contributes for improving the degree of modulation. The dielectric layer 31 and the dielectric layer 32 may also comprise a laminate of two or more dielectric layers each having different compositions.

The dielectric material used in the dielectric layers may be a compound containing at least one metal component selected from Si, Ge, Zn, Al, and rare earth metals, and the material is preferably an oxide, a nitride, or a sulfide. A mixture containing two or more of the foregoing may also be used. Exemplary preferable materials are a mixture of zinc sulfide and silicon oxide ($ZnS$—$SiO_2$), aluminum nitride, and aluminum oxide. The thickness of the first and the second dielectric layers may be adequately determined so that sufficient improvement in the protection and degree of modulation are achieved. However, the first dielectric layer 31 is preferably deposited to a thickness of 30 to 300 nm, and more preferably, to a thickness of 50 to 250 nm, and the second dielectric layer 32 is preferably deposited to a thickness of 10 to 50 nm, and more preferably, to a thickness of 13 to 45 nm. The dielectric layers are preferably formed by sputtering.

Recording Layer 4

The recording layer is not particularly limited for its composition, and the material used may be adequately selected from various phase change materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise element other than Sb and Te. Such element is preferably at least one element selected from In, Ag, Au, Bi, Se, Al, P, Ge, H, Si, C, V, W, Ta, Zn, Ti, Sn, Pb , Pd, and rare earth elements (Sc, Y, and lanthanoids), and among these, the preferred is at least one element selected from rare earth elements, Ag, In, and Ge in view of the particularly high effect in improving the storage reliability.

Preferably, the composition containing Sb and Te is the one as described below, namely, the composition represented by the formula (I):

$$(Sb_xTe_{1-x})_{1-y}M_y \qquad (I)$$

wherein M represents the element other than Sb and Te, and atomic ratio of the elements constituting the recording layer is preferably such that:

$$0.2 \leq x \leq 0.90,$$

and $$0 \leq y \leq 0.4,$$

and more preferably, $$0.5 \leq x \leq 0.85,$$

and $$0.01 \leq y \leq 0.2.$$

In practice, x may be suitably determined depending on whether the medium is used as a rewritable medium or a write once medium, and according to the recording linear velocity and the thermal design of the medium.

When the medium is a rewritable medium and x representing the content of Sb is too small in the above formula, crystallization speed will be excessively low and erasure of the record mark at a relatively high linear velocity will be difficult. In addition, when x is too small, reflectivity of the recording layer in the crystalline region will be insufficient, and the output of the output signal will be low. When x is extremely low, recording will be difficult. On the other hand, when x is too large, difference in reflectivity between the crystalline phase and the amorphous phase will be insufficient, and the output of the output signal will be low.

When the medium is a write once medium and x is too small, crystallization speed will be excessively low and initialization of the recording layer will be difficult. In addition, reflectivity of the recording layer in the crystalline region will be insufficient, and the output of the output signal will be low. When x is extremely low, recording will be difficult. On the other hand, when x is too large, crystallization speed will be excessively high, and use of the layer for the recording layer of a write once medium will be inadequate. In addition, when x is too large, difference in reflectivity between the crystalline phase and amorphous phase will be reduced and the output of the output signal will be low.

The element M is not particularly limited. However, it is preferable to select at least one member from the above-indicated elements for the M in view of storage reliability. When y representing the content of the element M is excessively large, crystallization speed may become excessively high or the output may become reduced.

The recording layer is preferably formed to a thickness of more than 4 nm to 50 nm, and more preferably, to a thickness of 5 nm to 30 nm. When the recording layer is too thin, transformation into the crystalline phase will be difficult and the reflectance difference created by the phase change will be insufficient. When the recording layer is too thick, the recording layer will have an increased heat capacity to render the recording difficult. An excessively thick recording layer also results in the reduced output of output signal.

The recording layer is preferably formed by sputtering.

It should be noted that the present invention is also applicable to the phase change optical recording medium described in JP-A 221814/1996. This optical recording medium is a medium having a recording layer formed by disposing thin layers of different composition to thereby produce a medium which does not require initialization (crystallization). The present invention is also applicable to the phase change optical recording medium described in JP-A 226173/1998. This optical recording medium is a medium having a recording layer formed by disposing thin layers of different composition to thereby speed up the initialization (crystallization). This optical recording medium does not require initialization when it is used as a write once medium.

Reflective Layer 5

The reflective layer 5 may be formed from any desired material, and typically, the reflective layer 5 is formed from a metal of high reflectivity such as Al, Au, Ag, Pt, or Cu as a simple substance or as an alloy containing at least one of such metals. The reflective layer is preferably formed by vapor deposition such as sputtering and evaporation.

Protective Layer 6

The protective layer 6 is provided for improving scratch resistance and corrosion resistance. Preferably, the protective layer is formed from an organic material, and typically, from a radiation curable compound or a composition thereof which has been cured with radiation such as electron beam or UV radiation. The protective layer is generally about 0.1 to about 100 $\mu$m thick and may be formed by conventional techniques such as spin coating, gravure coating, spray coating, and dipping.

Adhesive Layer

An adhesive layer is provided when the embodiment shown in FIG. 1 is used in producing an optical recording medium for double-side recording. The adhesive used for the adhesive layer is not particularly limited, and exemplary such adhesives include hot melt adhesives, UV curable adhesives, room temperature curable adhesives, and pressure-sensitive adhesives.

EXAMPLES

Example 1

Samples of an optical recording disk having the constitution as shown in FIG. 1 were prepared by using a light-transmitting substrate 2 produced by injection molding a polycarbonate in the shape of a disk having a diameter of 120 mm and a thickness of 0.6 mm, and forming grooves having a width of 0.2 $\mu$m and a depth of 20 nm at a pitch of 0.74 $\mu$m simultaneously with the injection molding; and disposing a first dielectric layer 31, a recording layer 4, a second dielectric layer 32, a reflective layer 5, and a protective layer 6 on the surface of the light-transmitting substrate 2 by the procedure as described below.

The first dielectric layer 31 was formed by sputtering in argon atmosphere using ZnS (80 mole %)—SiO$_2$ (20 mole %) for the target. The first dielectric layer was formed to a thickness of 90 nm.

The recording layer 4 was formed by sputtering. The recording layer had a composition (atomic ratio) of

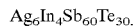

$Ag_6In_4Sb_{60}Te_{30}$.

The recording layer was formed to a thickness of 20 nm.

The second dielectric layer 32 was formed by a manner similar to that of the first dielectric layer. The second dielectric layer was formed to a thickness of 30 nm.

The reflective layer 5 was formed by sputtering in argon atmosphere using Al—1.7 mole % Cr alloy for the target. The reflective layer 5 was formed to a thickness of 100 nm.

The protective layer 6 was formed by applying a UV curable resin by spin coating and exposing it to UV for curing. The protective layer as cured had a thickness of 5 $\mu$m.

The thus produced samples were initialized by a bulk eraser, and the initialized samples were evaluated for the optimal overwriting conditions by recording and reading on an optical recording medium evaluator (DDU-1000 manufactured by Pulstec) under the conditions:

laser wavelength: 635 nm, numerical aperture, NA: 0.6, and recording signal: random signal of FEM, using the recording pulse strategy shown in FIG. 3. It was then found that:

optimal value of the linear velocity in the overwriting operation ($V_o$): 3.5 m/s, optimal value of the erasing power ($P_{eo}$): 6 mW, and optimal value of the recording power ($P_{wo}$): 12.5 mW.

The optimal bias power was 0.5 mW. When the overwriting operation was conducted under these conditions, clock jitter of the output signal was 8%. It should be noted that the clock jitter was evaluated by measuring the output signals with a time interval analyzer and calculating:

$$\sigma/Tw(\%)$$

wherein Tw stands for window width. The clock jitter is fluctuation by time of the output signal at the frequency corresponding to the standard clock width (1T). The output signal will enjoy an acceptable quality if the clock jitter with no tilting is up to 9% when tilt margin is taken into consideration, namely, when increase in the jitter by tilting of the disk is calculated. It should be noted that a jitter in excess of 13% unacceptable.

Next, the samples immediately after the initialization was recorded for the first time under the conditions shown in the following Tables 1 to 3. Tables show linear velocity $V_w$, erasing power $P_{ew}$ and recording power $P_{ww}$ in the initial recording operation as relative values in relation to the $V_o$, $P_{eo}$ and $P_{wo}$ as described above, respectively. The recording power $P_{ww}$ in each Table is the recording power at which the jitter is minimized under the condition wherein the linear velocity is fixed to $V_w$ and the erasing power is fixed to $P_{eo}$. The optimal value of the $P_{ew}$ in each Table is the erasing power at which the jitter is minimized under the condition wherein the linear velocity is fixed to $V_w$ and the recording power is fixed to $P_{ww}$. It should be noted that, in the recording, the recording pulse strategy used was the one shown in FIG. 3, and the bias power was fixed to 0.5 mW.

After the recording, clock jitter of the output signal was measured. The results are shown in the Tables. The jitter was measured at a linear velocity of 3.5 m/s in all cases.

TABLE 1

| Case No. | | Vw/Vo | Pew/Peo | | Pww/Pwo | Jitter (%) |
|---|---|---|---|---|---|---|
| 101 | (Comparative) | 2 | 0.30* | | 1.04 | 10.0* |
| 102 | | 2 | 0.50 | | 1.04 | 8.1 |
| 103 | | 2 | 0.67 | (Optimal value) | 1.04 | 7.7 |
| 104 | (Comparative) | 2 | 1.17* | | 1.04 | 13.0* |

*a value outside the scope of the present invention or a value outside the preferable range

TABLE 2

| Case No. | | Vw/Vo | Pew/Peo | | Pww/Pwo | Jitter (%) |
|---|---|---|---|---|---|---|
| 201 | (Comparative) | 3 | 0.30* | | 1.08 | 10.9* |
| 202 | | 3 | 0.50 | | 1.08 | 8.7 |
| 203 | | 3 | 0.83 | (Optimal value) | 1.08 | 8.1 |
| 204 | (Comparative) | 3 | 1.17* | | 1.08 | 13.0* |

*a value outside the scope of the present invention or a value outside the preferable range

TABLE 3

| Case No. | | Vw/Vo | Pew/Peo | | Pww/Pwo | Jitter (%) |
|---|---|---|---|---|---|---|
| 301 | (Comparative) | 4 | 0.30* | | 1.16 | 13.7* |
| 302 | | 4 | 0.50 | | 1.16 | 8.9 |
| 303 | | 4 | 0.83 | (Optimal value) | 1.16 | 7.8 |
| 304 | (Comparative) | 4 | 1.17* | | 1.16 | 16.7* |

*a value outside the scope of the present invention or a value outside the preferable range The results of Tables 1 to 3 demonstrate the merits of the present invention. To be more specific, there is demonstrated that, when $V_w$ and $V_o$ are such that:

$$V_w/V_o > 1,$$

the jitter critically reduces when $P_{ew}$ and $P_{eo}$ are such that:

$$0.3 < P_{ew}/P_{eo} < 1.$$

Example 2 3

The samples produced in Example 1 were evaluated by the experiments as described below. In the following description, "the conditions of the initial recording operation in Example 1" means the combination of the linear velocity $V_w$, the erasing power $P_{ew}$, and the recording power $P_{ww}$ in Case Nos. 103, 203 and 303, respectively.

First, the initialized sample was recorded by the initial recording operation under the conditions the same as the initial recording operation of Example 1, and the sample was overwritten also under the conditions the same as the initial recording operation. The jitter was measured to be in excess of 15% in all of the cases wherein the conditions of the initial recording operation were the same as Case Nos. 103, 203 and 303. The results indicate that the samples satisfied the third condition of the conditions required for the write once medium at the linear velocity $V_w$ used in the initial recording operation in each case.

Next, the initialized sample was recorded by the initial recording operation under the conditions the same as the initial recording operation of Example 1, and measured for the $R_{ini}$ of the second condition as described above. The sample was then erased by irradiating a DC laser beam at an output of 4 mW at the same linear velocity as the initial recording operation, and the $R_{top}$ and the $R_{bottom}$ of the area irradiated with the DC laser beam were measured to calculate $(R_{top}+R_{bottom})/2R_{ini}$. The reflection level was measured on an optical recording medium evaluator (DDU-1000 manufactured by Pulstec), and the jitter was measured after the irradiation of the DC laser beam. It was then found that, when the condition of the initial recording operation was the same as that of the Case No. 103, the $R_{ini}$, the $R_{top}$, and the $R_{bottom}$ were:

$$(R_{top}+R_{bottom})/2R_{ini}=0.9,$$

and the jitter was measured to be in excess of 15%. When the condition of the initial recording operation was the same as that of the Case No. 203, the $R_{ini}$, the $R_{top}$, and the $R_{bottom}$ were:

$$(R_{top}+R_{bottom})/2R_{ini}=0.7,$$

and the jitter was also measured to be in excess of 15%. When the condition of the initial recording operation was the same as that of the Case No. 303, the $R_{ini}$, the $R_{top}$, and the $R_{bottom}$ were:

$$(R_{top}+P_{bottom})/2R_{ini}=0.6,$$

and no substantial alteration in the output was found before and after the irradiation of the DC laser beam. The results indicate that the samples satisfied the second condition of the conditions required for the write once medium at the linear velocity $V_w$ used in the initial recording operation in each case.

In addition, after the irradiation of the DC laser, the sample was recorded under the same conditions as the initial recording operation of Example 1, and the sample was then evaluated for the jitter. The jitter was measured to be in excess of 15% in all of the cases. The results indicate that the sample satisfied the fourth condition of the conditions required for the write once medium at the linear velocity $V_w$ used in the initial recording operation in each case.

It should be noted that, when the power of the DC laser beam irradiated was increased from 4 mW, the recording layer melted at last, and the irradiated area became amorphous after the laser beam irradiation. In other words, recrystallization of the recording layer could not be accomplished by increasing the laser power.

Merits of the Invention

In the present invention, initial recording of the unrecorded area of a phase change recording layer is conducted by using a linear velocity higher than the one used in the overwriting operation, and the initial recording operation at a high speed is thereby enabled. Furthermore, in the present invention, the erasing power used in the initial recording at the high speed is controlled to be below the one used in the overwriting operation, and increase of the jitter associated with a high linear velocity recording is thereby suppressed.

Japanese Patent Application Nos. 95795/2000 and 024896/2001 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording method for recording an optical recording medium having a phase change recording layer wherein the recording is conducted such that:

$$V_w/V_o > 1,$$

and $$0.3 < P_{ew}/P_{eo} < 1$$

when the unrecorded area of the recording layer is recorded by using a linear velocity of $V_w$ and an erasing power of $P_{ew}$ and overwritten by using a linear velocity of $V_o$ and an erasing power of $P_{eo}$.

2. An optical recording method according to claim 1 wherein the recording is conducted such that:

$$2 \leq V_w/V_o \leq 20.$$

3. An optical recording method according to claim 1 wherein the recording is conducted such that:

$$0.5 \leq P_{ew}/P_{eo} \leq 0.9.$$

4. An optical recording method according to claim 1 wherein the recording is conducted such that:

$$P_{ww}/P_{wo} > 1$$

when the unrecorded area of the recording layer is recorded by using a recording power of $P_{ww}$ and overwritten by using a recording power of $P_{wo}$.

5. An optical recording method according to claim 4 wherein the recording is conducted such that:

$$1.1 \leq P_{ww}/P_{wo} \leq 2.$$

6. An optical recording method according to claim 1 wherein said method is conducted by using an optical recording medium having recording conditions used in the overwriting operation and recording conditions used in the recording of the unrecorded area.

7. An optical recording method according to claim 1 wherein said unrecorded area is either an area which has never been recorded after the initialization or an area which has been erased after recording.

8. An optical recording method according to claim 1 wherein said linear velocity $V_o$ is the optimal linear velocity in the overwriting operation and said $P_{eo}$ is the optimal erasing power in the overwriting operation.

9. An optical recording method according to claim 1 wherein said medium is not overwritable at said linear velocity $V_w$.

10. An optical recording apparatus for conducting the optical recording method according to claim 1.

11. An optical recording medium to which the optical recording method according to claim 1 is applied, wherein said medium has recording conditions used in the overwriting operation and recording conditions used in the recording of the unrecorded area.

* * * * *